United States Patent
Bombaci

(10) Patent No.: US 12,338,633 B2
(45) Date of Patent: Jun. 24, 2025

(54) BALUSTER INSTALLATION DEVICE AND METHODS OF USE

(71) Applicant: Jared William Bombaci, Colchester, CT (US)

(72) Inventor: Jared William Bombaci, Colchester, CT (US)

( * ) Notice: Subject to any disclaimer, the term of this patent is extended or adjusted under 35 U.S.C. 154(b) by 333 days.

(21) Appl. No.: 17/943,741

(22) Filed: Sep. 13, 2022

(65) Prior Publication Data

US 2024/0084602 A1     Mar. 14, 2024

(51) Int. Cl.
  *E04F 11/18*     (2006.01)
  *B23P 11/00*     (2006.01)
  *B25H 7/04*     (2006.01)

(52) U.S. Cl.
  CPC .......... *E04F 11/1848* (2013.01); *B23P 11/00* (2013.01); *B25H 7/04* (2013.01)

(58) Field of Classification Search
  CPC ................. E04F 11/1817; E04F 11/1848
  USPC .......................................... 33/613
  See application file for complete search history.

(56) References Cited

U.S. PATENT DOCUMENTS

| | | | | |
|---|---|---|---|---|
| 5,491,905 A * | 2/1996 | Jablonski | ................ | E04F 21/00 33/481 |
| 11,686,567 B2 * | 6/2023 | Lowe | ........................ | G01C 9/28 33/613 |

* cited by examiner

*Primary Examiner* — Jason L Vaughan
(74) *Attorney, Agent, or Firm* — Hubert W. Pfabe

(57) ABSTRACT

A baluster installation device and related methods of use may be used to aid in holding, leveling, and properly installing balusters, spindles, rails, and similar components. The device may be configured to be removable attachable to a component, such as a baluster. The device may further be configured to aid in proper alignment and spacing of balusters and may include one or more features to aid in location and marking of locations or distances. The device may also include one or more features configured to aid in properly aligning retention components, such as screws. The device may also include one or more additional components or features, which may optionally be removable or attachable, such as a level or thumb screws.

20 Claims, 3 Drawing Sheets

BALUSTER INSTALLATION DEVICE AND METHODS OF USE

BACKGROUND

The present disclosure relates generally to an installation device and methods of use. More particularly, the present disclosure relates to a reusable device which may be used to aid in the installation, orientation, and fixation of balusters, spindles, and other similar components and items.

Many buildings include railings or other features which require balusters, spindles, and other similar columns or components, whether circular, square in cross-section, or a wide range of other shapes. There are a number of difficult and/or time-consuming steps which must be taken when installing items such as balusters, and there are generally no tools available to aid in this process to truly simplify it. A baluster is preferably installed at a specified distance from a starting point, such as a wall, column, or other baluster. Depending on the locality, there may be codes in place governing maximum distances between balusters, and distances must be kept consistent in order to be aesthetically pleasing. Additionally, balusters must be installed vertically, or, at a minimum, at a consistent angle, so as to appear pleasing to the eye.

Current methods of installation of a baluster include using a tape measure to mark off a location for a baluster, or pre-drilling or routing a recess for a baluster, whether at the top, bottom, or both. These locations must all be carefully measured, and consistency must be maintained. A baluster is then located where designated, though multiple balusters are not always parallel, leading to what is sometimes called a "jagged teeth" appearance. To avoid this, a level may be used, though this requires an additional hand to hold the level in place, while also holding the baluster, aligning it, and attempting to drill a screw or turn a set screw into place to retain the baluster. This is a difficult and time-consuming process, and is not easily done by a single user, and is difficult to accomplish with consistent and appealing results.

Current tools and methods of installation for balusters and similar items continue to require significant amounts of time, practice and expertise, and often require more than one individual to perform installation. Additionally, current tools and methods of installation lack repeatability, consistency, and accuracy, or present users with additional difficulties and limitations. Current devices and methods of use do not adequately enable efficient, effective, reliable, accurate, and repeatable installation of balusters.

SUMMARY

The present disclosure relates generally to an installation device and methods of use. More particularly, the present disclosure relates to a reusable device which may be used to aid in the installation, orientation, and fixation of balusters, spindles, and other similar components and items. The installation device enables a user to effectively and easily locate the position for a baluster, align the baluster, fix the baluster into an initial position, check the orientation of the baluster, and fix it at a second position. The installation device also aids in confirming that the installed distance of a baluster relative to a starting point is within acceptable tolerances and distances.

An installation device is disclosed, which may be used to aid in the installation of balusters, spindles, and other similar components, such as those used in the construction of railings and balustrades, among other similar endeavors. The installation device may include a bottom side, a right side, and a left side. The device may include a front surface, which may be defined by an end of the bottom side, the right side, the left side, two of the sides, or all three. The device may also include a back surface, which may be defined by another edge of the bottom side, the right side, the left side, two of the sides, or all three. The bottom side, right side, and left side may also define an at least partially open central cavity, which may be configured to receive at least a portion of a baluster or similar component.

The device may include at least one baluster retention feature, such as a thumb screw or a hole configured to receive a thumb screw. The baluster retention feature may be on one or more of the bottom side, the left side, or the right side. The device may also include a fixation component insertion opening, such as a slot configured to receive a screw or a nail for fixing the baluster to a railing, base, or other surface. The fixation component insertion opening may be on the right side, the left side, the bottom side, or on more than one side.

In some embodiments, the distance between the front surface and the back surface may be less than 4", such as approximately 3½", or may be less or more than 3½". The device may also optionally include a prominence extending from the back surface and away from the front surface. The distance from the back edge of the prominence to the front surface may optionally be more than 4", equal to 4", or another amount.

The installation device may include a level, or may include one or more features to enable a user to connect or retain a level to the device.

In one method of use, a user may place the installation device against a starting surface, such as a wall, other baluster, spindle, or other desired surface or feature. The user may use the device to determine the location of an edge for a baluster to be installed, such as by marking a line along an edge of the back surface while the front surface is pressed against the starting surface. The device may be connected to the baluster to be installed, such as proximal to a first end of the baluster, such as the top end. An edge of the baluster may be located at or near the mark. Alignment of the baluster may optionally be checked using a level or the level component of the device. The baluster may be fixed into position relative to the first surface, such as the underside of a railing. Screws or other fixation components may be inserted through one or more slots in the device.

The device may be moved proximal to a second end of the baluster, such as at or near the bottom. The device may be connected to the baluster. Alignment of the baluster may optionally be checked, such as through the use of a level or the level component of the device. The baluster may be fixed into position relative to a second surface, such as the top surface of a base. Screws or other fixation components may be inserted through one or more slots in the device. A user may then optionally use the device to align and insert additional fixation components, such as screws, if desired, whether at the top or at the bottom.

During the method of use, a user may at any point optionally check the relative distance of the baluster to the starting surface using the device, such as by confirming that the entire device, including the prominence, cannot fit in between the baluster and the starting surface.

The disclosure relates to an installation device and method of use, such as through the use of the described invention. The method may include the use of an installation device which may include one or more of the features or components described herein. Any number of components or features may be used in conjunction with and incorporated into the installation device described. Various materials, including metals, plastics, and composites, may be used for the described components and features.

It is to be understood that the above mentioned features and the features yet to be explained hereinafter can be used not only in the respectively mentioned combinations but also in other combinations or alone without departing from the context of the present invention.

BRIEF DESCRIPTION OF THE DRAWINGS

The invention is now disclosed in detail with reference to exemplary embodiments shown in the accompanying drawings, where.

DETAILED DESCRIPTION

Exemplary embodiments of the disclosure are illustrated in the Figures and are explained in the following description in more detail, wherein identical, or similar, reference numbers refer to identical, or similar, or functionally identical or similar components.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features or those previously described are omitted or simplified in order not to obscure the illustrative embodiments.

Various operations may be described as multiple discrete operations, in turn, in a manner that is most helpful in understanding the present invention, however the order of description should not be construed as to imply that these operations are necessarily order dependent. In particular, these operations need not be performed in the order of presentation. In some instances, structures and devices may be shown in block diagram or flow chart form in order to facilitate describing the disclosed subject matter.

Figure 1:
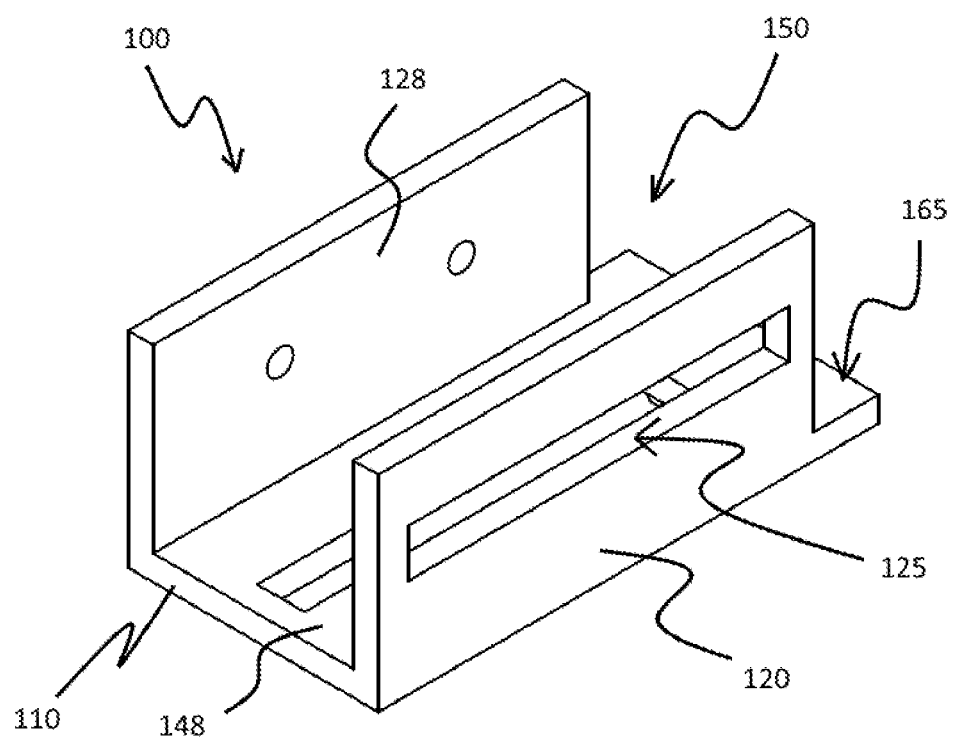
FIG. 1 shows a front top right isometric view of an embodiment of a baluster installation device of the present disclosure.
Figure 2:
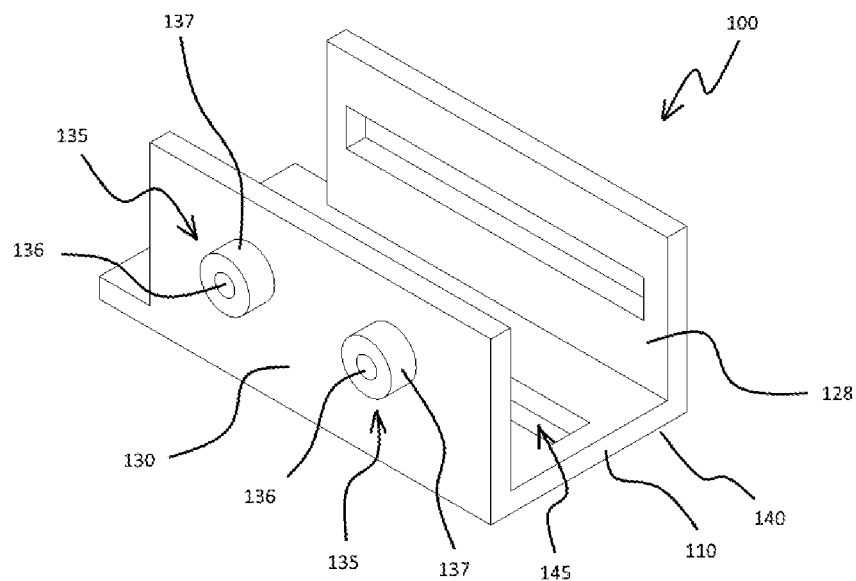
FIG. 2 shows a front top left isometric view of the embodiment of the baluster installation device of FIG. 1.
Figure 3:
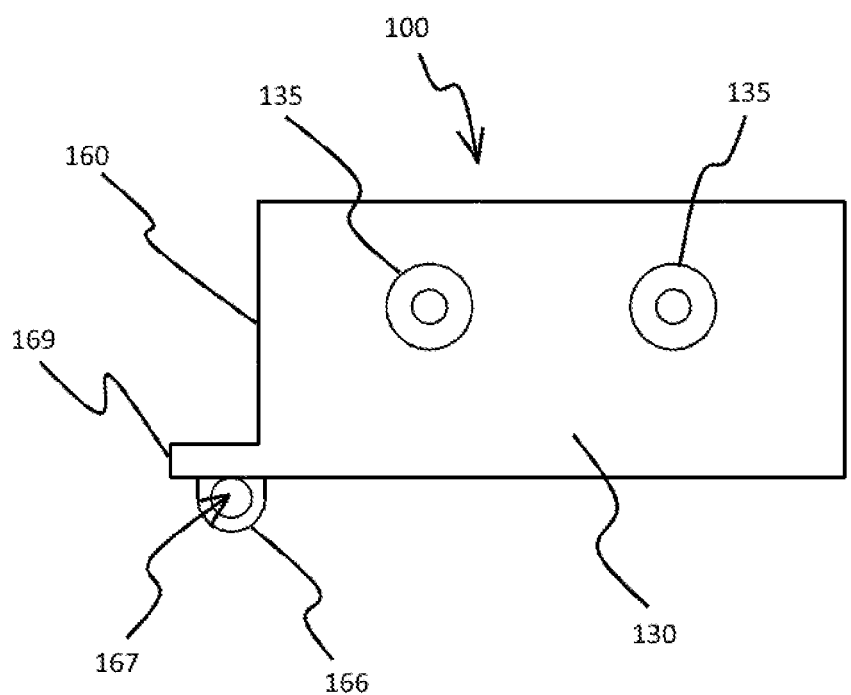
FIG. 3 shows a left side view of the embodiment of the baluster installation device of FIG. 1.
Figure 4:
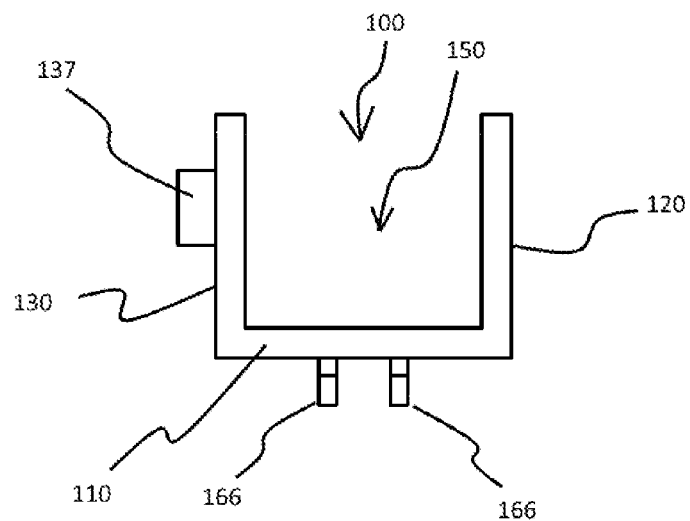
FIG. 4 shows a front view of the embodiment of the baluster installation device of FIG. 1.
Figure 5:
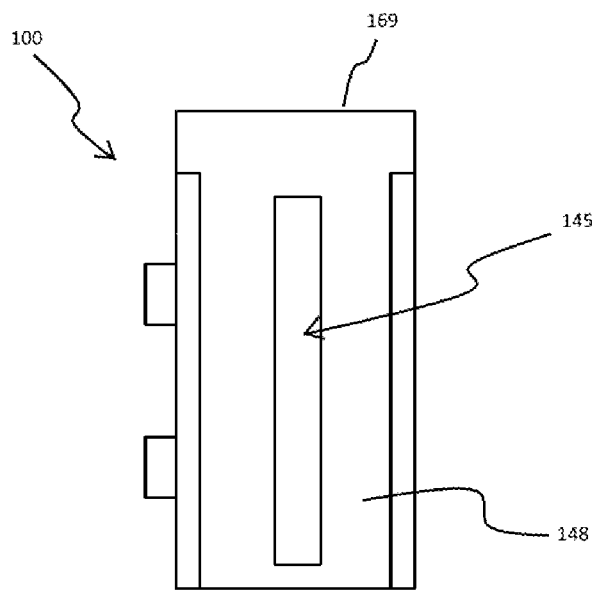
FIG. 5 shows a top view of the embodiment of the baluster installation device of FIG. 1.

An embodiment of a baluster installation device 100 is shown in FIGS. 1-5. Though the device is described as a baluster installation device herein for simplicity, it should be understood that the device, or embodiments of the device, may be used to aid in the installation or replacement of things other than just balusters. The device 100 could similarly be used to install spindles, railings or other railing components, steps, or other items or components wherein a device to aid in installation, alignment, orientation, or levelling may be beneficial.

As depicted, the device 100 may be substantially rectangular in profile, including when viewed from a top, bottom, or side perspective. It should be understood that, in other embodiments, other cross-sectional or profile shapes may also be used without deviating from the scope or intent of this disclosure, such as square, pentagonal, hexagonal, octagonal, triangular, circular, elliptical, or compound shapes optionally including proud features or recessed features or cutouts. The device 100 may be made partially or entirely of metal, plastic, resin, hybrid materials, or any other suitable material or materials. The device 100, or components of the device 100, may be machined, molded, extruded and machined, manufactured through additive manufacturing, may be made of sheet stock, such as sheet metal, which may be bent, or made through any other methods or combinations of methods known in the art.

The device 100 may include a front face 110. The front face 100 may be substantially flat, as shown, or may be convex or concave, or may include proud or recessed features, such as to fit partially around a baluster or to other contact a baluster or feature of a baluster in a complementary fashion. The device may also include a right side 120 and a left side 130. The right side 120 and the left side 130 may be substantially the same shape and size, as shown, or may be different sizes or different shapes. One or both of the right side 120 and the left side 130 may include one or more slots 125, holes, or other cutouts or openings, such as to aid in alignment of and securement of a screw or other fastening component through the slot or cutout 125. In the embodiment shown, the right side 120 defines an elongated slot 125 extending through the inside surface 128, through which a screw may be inserted and used to fasten the baluster to a railing or to a base or other similar features or components.

One or both of the right side 120 and the left side 130 may include a baluster retention feature 135 or component or multiple baluster retention features 135 or components. In the embodiment shown, the device 100 includes two baluster retention features 135 on the left side 130. The baluster retention feature 135 may be any feature or component suitable for aiding in removably retaining a device 100 against a baluster. In some embodiments, the baluster retention feature 135 may be one or more thumb screws, though other features or components may be used without deviating from the scope or intent of this disclosure. In the embodiment shown, the left side 130 defines two opening 136. The side 120, 130 which includes the one or more openings 136 may optionally also include one or more prominences 137 to aid in retaining an additional component, such as a thumb screw or to strengthen the area around the opening 136. When used with a threaded component, the opening 136, prominence 137, or both, may be threaded. In the embodiment shown, there are two prominence 137 on the left side, each with a through hole 136 extending to an inside surface 138 of the left side. The through hole 136 is threaded to enable retention of a thumb screw in the device 100 and against a baluster.

The device 100 may define an at least partially open central cavity 150. The cavity 150 may be sized so as to fit at least partially around a baluster or a feature of a baluster. The cavity 150 may be define by one or more sides. In the embodiment shown, the cavity 150 is defined by the inside surface 128 of the right side 120 of the device 100, the inside surface 138 of the left side 130 of the device 100, and the inside bottom surface 148 of a bottom side 140 of the device 100.

The bottom side 140 may optionally include one or more additional retention features 135 and/or may define one or more additional openings or slots 145 to aid in locating and installing fixation features, such as screws. In the embodiment shown, the device 100 includes a slot 125 on the right side, an elongated slot 145 on the bottom side, and two retention features 135 on the left side 130.

The device 100 may include a back side 160. The back side 160 may be substantially flat or planar, may be at least partially convex or concave, may have one or more recesses, or may have one or more prominences. In the embodiment shown, the back side 160 includes a rear prominence 165 extending beyond the surface of the back side 160. The rear prominence may further include one or more levelling components or features, or may include one or more level retention features 166. The level retention feature 166 may include one or more features to aid in the attachment or retention of a level component. In the embodiment shown, the two level retention features 166 each include an opening 167 to allow for installation of a cylindrical level into the device 100, whether at the time of manufacture of the device 100 or by a user of the device 100. It should be understood that the level may be on other surfaces or features of the device 100, may be removable or integral with the device 100, or may be entirely absent from the device 100 without deviating from the scope or intent of this disclosure.

The device 100 may be used to retain, located, align, and otherwise aid in the installation of a baluster or similar component. In one method of use, the front side 110 of the device 100 may be placed against a starting post, wall, or other feature that is to be used as a reference for location and spacing of a baluster. The back side 160 may then be used as a reference to mark a location, such as along the underside of a railing or along a base feature or surface, for a baluster to be installed. A line may be drawn along the railing or base, using the left side 130 or ride side 120 at the back side 160 for reference or as an edge. In one embodiment, the distance between the front side 110 and the back side 160 is 3½ ", allowing for marking and spacing at balusters at 3½ " intervals, though it should be understood that of distances, whether greater or smaller, may also be used without deviating from the scope or intent of this disclosure.

The device 100 may be removably secured to a baluster or other similar component, such as by fitting the cavity 150 at least partially around a baluster or feature of a baluster and securing the device 100 by means of thumb screws or otherwise by means of the retention feature 135. The baluster may be aligned with the mark previously created. The level may optionally be used to check alignment of the baluster. A fastening component, such as a screw or nail, may be inserted through a slot in the device 100, such as the right side slot 125 or the bottom slot 145, connecting the baluster to the railing, base, or other surface or component. A second fastening component may optionally be used, such as through the second slot 125, 145, now or later in the process.

The fastening feature, such as a thumb screw, may be loosened or removed, and the device 100 may be moved, such as by sliding, towards an opposing end of the baluster, such as towards the bottom. The fastening feature may optionally be tightened or connected at this second location. Alignment of the baluster may be confirmed optionally with the level, and adjusted if necessary or desirable.

A fastening component, such as a screw or nail, may be inserted through a slot in the device 100, such as the right side slot 125 or the bottom slot 145, connecting the baluster to the base, railing, or other surface or component. A second fastening component may be inserted, such as through the second slot 124, 145, as well, or may be omitted or inserted later.

A user may optionally return to the first end with the device 100 to insert a second fastening component, if desired and if not previously having done so, or may choose to install additional fasteners at this stage or at any other stage of the process, if desired.

A user may confirm appropriate spacing of the baluster at any time during the process, such as prior to the first fastener being installed at the first end, prior to the second fastener being installed at the second end, prior to a second fastener being installed at either end, or after installation of a baluster. The distance between the front face and the back face may be used to confirm that the distance is correct. Similarly, at any of the aforementioned steps in the process, the entire device 100 may be slid against the baluster to see if it fits between the first baluster and the reference feature or surface, or between subsequent balusters. The back prominence 165 may extend beyond the back side 160 such that the distance between the front side 110 and the back prominence 165 is greater than the desired spacing. If the device 100 is able to pass through the spacing at the length between the front side 110 and the back prominence 165 then the baluster may be too far apart from the previous reference surface or feature. In one embodiment, the back prominence end face 169 is 4" from the front face 110. In some localities, it is against code to have balusters more than 4" apart, and this method will aid a user in preventing installation of balusters against code. It should be understood that the distance between the front face 110 and the back prominence end face 169 may be more than 4" or less than 4" without deviating from the scope or intent of this disclosure.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention. Accordingly, various modifications, adaptations, combinations, and alternatives may occur to one skilled in the art without departing from the spirit of the invention and scope of the claimed coverage.

What is claimed is:

1. An installation device, comprising:
   a bottom side;
   a right side; and
   a left side;
   wherein at least one first end of at least one of the bottom side, the right side, and the left side defines a front surface, at least one second end of at least one of the bottom side, the right side, and the left side defines a back surface, and the bottom side, the right side, and the left side define an at least partially open cavity configured to receive at least a portion of a baluster, and further comprising at least one baluster retention feature, further wherein the at least one baluster retention feature is configured to adjustably apply force to at least a first baluster surface of the baluster.

2. The installation device according to claim 1, further wherein at least one of the right side and the left side comprises the at least one baluster retention feature, and further wherein the at least one baluster retention feature is further configured to resist motion of the installation device relative to a first end of the baluster when the at least one baluster retention feature is in a deployed configuration.

3. The installation device according to claim 2, further wherein at least one of the right side and the left side defines a first fixation component insertion opening.

4. The installation device according to claim 2, further wherein the bottom side defines a fixation component insertion opening, and further wherein the fixation component insertion opening is configured to aid a user in aligning a fixation component through the fixation component insertion opening and further through a first fixation surface of a first mounting structure proximal to the front surface or the back surface, further wherein the first fixation surface is not tangent to the bottom side.

5. The installation device according to claim 4, further wherein the distance between the front surface and the back surface is less than 4".

6. The installation device according to claim 4, further wherein a rear prominence extends from the back surface.

7. The installation device according to claim 6, further wherein the rear prominence comprises a rear prominence face which is distal to the back surface relative to the front surface.

8. The installation device according to claim 4, further wherein the installation device further comprises a level.

9. The installation device according to claim 4, further wherein the installation device comprises at least one level connection feature, and further wherein the at least one level connection feature is configured to removably retain a level.

10. The installation device according to claim 4, further wherein the distance between the front surface and the back surface is less than 3½", a rear prominence extends from the back surface, and the rear prominence comprises a rear prominence face which is 4" from the front surface.

11. The installation device according to claim 2, further wherein the at least one baluster retention feature comprises at least one thumb screw.

12. An installation device, comprising:
a bottom side;
a right side;
a left side; and
a thumb screw;
wherein at least one first end of at least one of the bottom side, the right side, and the left side defines a front surface, at least one second end of at least one of the bottom side, the right side, and the left side defines a back surface, and the bottom side, the right side, and the left side define an at least partially open cavity configured to receive at least a portion of a baluster, and further wherein the thumb screw passes through a first opening defined by the left side, and the right side defines a second opening configured to receive a fastener, and further wherein the thumb screw is configured to adjustably apply force to at least a first baluster surface of the baluster.

13. The installation device according to claim 12, further wherein the bottom side defines a third opening configured to receive a fastener and aid in aligning the fastener so as to pass at least partially through the baluster and at least partially into a mounting structure proximal to a first end of the baluster.

14. The installation device according to claim 13, further wherein a rear prominence extends from the back surface and the rear prominence comprises a rear prominence face which is distal to the back surface relative to the front surface.

15. A method of using an installation device, comprising:
placing the installation device against a starting surface;
creating a mark to denote the location on a first edge of a first baluster using a second edge of the installation device;
attaching the installation device to the first baluster proximal to a first end of the first baluster;
aligning the first edge of the first baluster with the mark;
affixing the first end of the first baluster to a first retention surface;
moving the installation device and connecting the installation device proximal to a second end of the first baluster; and
affixing the second end of the first baluster to a second retention surface;
wherein the installation device comprises a bottom side, a right side, and a left side, and further wherein at least one first end of at least one of the bottom side, the right side, and the left side defines a front surface, at least one second end of at least one of the bottom side, the right side, and the left side defines a back surface, and the bottom side, the right side, and the left side define an at least partially open cavity configured to receive at least a portion of the first baluster.

16. The method of using an installation device according to claim 15, further wherein the right side further defines a first fixation opening configured to receive a first fixation component.

17. The method of using an installation device according to claim 16, further wherein the bottom side further defines a second fixation opening configured to receive a second fixation component.

18. The method of using an installation device according to claim 15, further comprising checking the orientation of the first baluster using a level which is integral with the installation device.

19. The method of using an installation device according to claim 15, further comprising confirming the distance of the first baluster relative to the starting surface using the length of the installation device.

20. The method of using an installation device according to claim 15, further comprising retaining the installation device to the first baluster proximal to the first end of the first baluster through the use of a first adjustable retention feature configured to resist motion of the installation device relative to the first end of the first baluster along a first axis defined by a length of the first baluster extending from the first end of the first baluster to the second end of the second baluster.

* * * * *